US012592933B2

(12) United States Patent
Cannizzaro

(10) Patent No.: US 12,592,933 B2
(45) Date of Patent: Mar. 31, 2026

(54) SYSTEMS AND METHODS FOR MANAGING RESOURCE ACCESS PERMISSIONS

(71) Applicant: Capital One Services, LLC, McLean, VA (US)

(72) Inventor: Dominic Joseph Cannizzaro, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 247 days.

(21) Appl. No.: 18/462,016

(22) Filed: Sep. 6, 2023

(65) Prior Publication Data

US 2025/0080542 A1 Mar. 6, 2025

(51) Int. Cl.
*H04L 9/40* (2022.01)
(52) U.S. Cl.
CPC .......... *H04L 63/105* (2013.01); *H04L 63/101* (2013.01); *H04L 63/20* (2013.01)

(58) Field of Classification Search
CPC ...... H04L 63/105; H04L 63/101; H04L 63/20
USPC .............................................................. 726/4
See application file for complete search history.

(56) References Cited

U.S. PATENT DOCUMENTS 9,948,649 B1 * 4/2018 Zhao ...................... H04L 63/20

* cited by examiner

*Primary Examiner* — Anthony D Brown
(74) *Attorney, Agent, or Firm* — Foley & Lardner LLP

(57) ABSTRACT

Systems and methods for managing resource access permissions for users with unknown credentials are disclosed herein. A resource access request may be received. A measure of risk may be determined. In response to determining that a first access level is permitted, the first user identifier may be inserted in a first access control list. Based on information regarding resources accessed by the first user, an updated measure of risk may be determined. In response to determining that a second access level is permitted, the first user identifier may be inserted in a second access control list.

20 Claims, 9 Drawing Sheets

100

| Access Control List Identifier 102 | |
|---|---|
| 329092409 | |
| Access Control List Members 104 | |
| Username 106 | Control List Insertion Time 108 |
| jashan | 2010-07-16T19:23-05:00 |
| elbose | 2010-07-17T16:12-05:00 |
| joraman | 2013-09-02T08:43-05:00 |
| yianderson | 2018-03-10T23:53-05:00 |
| shjones | 2020-12-25T03:01-05:00 |
| sesingh | 2022-11-30T10:25-05:00 |
| aasinger | 2023-06-04T16:20-05:00 |
| Access Control List Metadata 110 | |
| Access Level Requirements 112 | Access Level 1 |
| | Access Level 2 |
| | Access Level 3 |
| | Access Level 4A |
| Resource ID of Accessible Resources 114 | 39258 |
| | 23029 |
| | 76921 |
| | 93291 |

100

| Access Control List Identifier 102 | |
|---|---|
| 329092409 | |
| Access Control List Members 104 | |
| Username 106 | Control List Insertion Time 108 |
| jashan | 2010-07-16T19:23-05:00 |
| elbose | 2010-07-17T16:12-05:00 |
| joraman | 2013-09-02T08:43-05:00 |
| yianderson | 2018-03-10T23:53-05:00 |
| shjones | 2020-12-25T03:01-05:00 |
| sesingh | 2022-11-30T10:25-05:00 |
| aasinger | 2023-06-04T16:20-05:00 |
| Access Control List Metadata 110 | |
| Access Level Requirements 112 | Access Level 1 |
| | Access Level 2 |
| | Access Level 3 |
| | Access Level 4A |
| Resource ID of Accessible Resources 114 | 39258 |
| | 23029 |
| | 76921 |
| | 93291 |

| Resource Access History Database<br>202 | | |
|---|---|---|
| User Identifier<br>204 | | |
| yianderson | | |
| Action<br>206 | Resource ID of Associated Resource<br>208 | Timestamp<br>210 |
| Access request for resource: 39258 | 39258 | 2018-03-10T08:20-05:00 |
| Read request for file: README.txt | 39258 | 2018-04-05T11:19-05:00 |
| Write request for file: README.txt | 39258 | 2018-04-05T11:35-05:00 |
| File transfer request to user ID veroberts | 93291 | 2018-04-06T18:07-05:00 |
| User Identifier<br>212 | | |
| joraman | | |
| Action<br>214 | Resource ID of Associated Resource<br>216 | Timestamp<br>218 |
| Access request for resource: 39258 | 23030 | 2013-09-02T07:30-05:00 |
| Read request for file: README.txt | 23030 | 2013-09-02T10:15-05:00 |

| Required Action Database 302 | | |
|---|---|---|
| Access Control List Identifier 304 | | |
| 329092409 | | |
| Action 306 | Resource ID of Associated Resource 308 | Action Type 310 |
| Resource access request | 39258 | Required Action |
| Read request for file: README.txt | 39258 | Required Action |
| Write request for file: README.txt | 39258 | Prohibited Action |
| File transfer request to external users | 93291 | Prohibited Action |
| Access Control List Identifier 312 | | |
| 329092410 | | |
| Action 314 | Resource ID of Associated Resource 316 | Action Type 318 |
| Resource access request | 23030 | Required Action |
| Write request for file: UpdatedContactInfo.txt | 23030 | Required Action |

702 — Gather relevant system data

704 — Translate into inputs

706 — Develop access menu

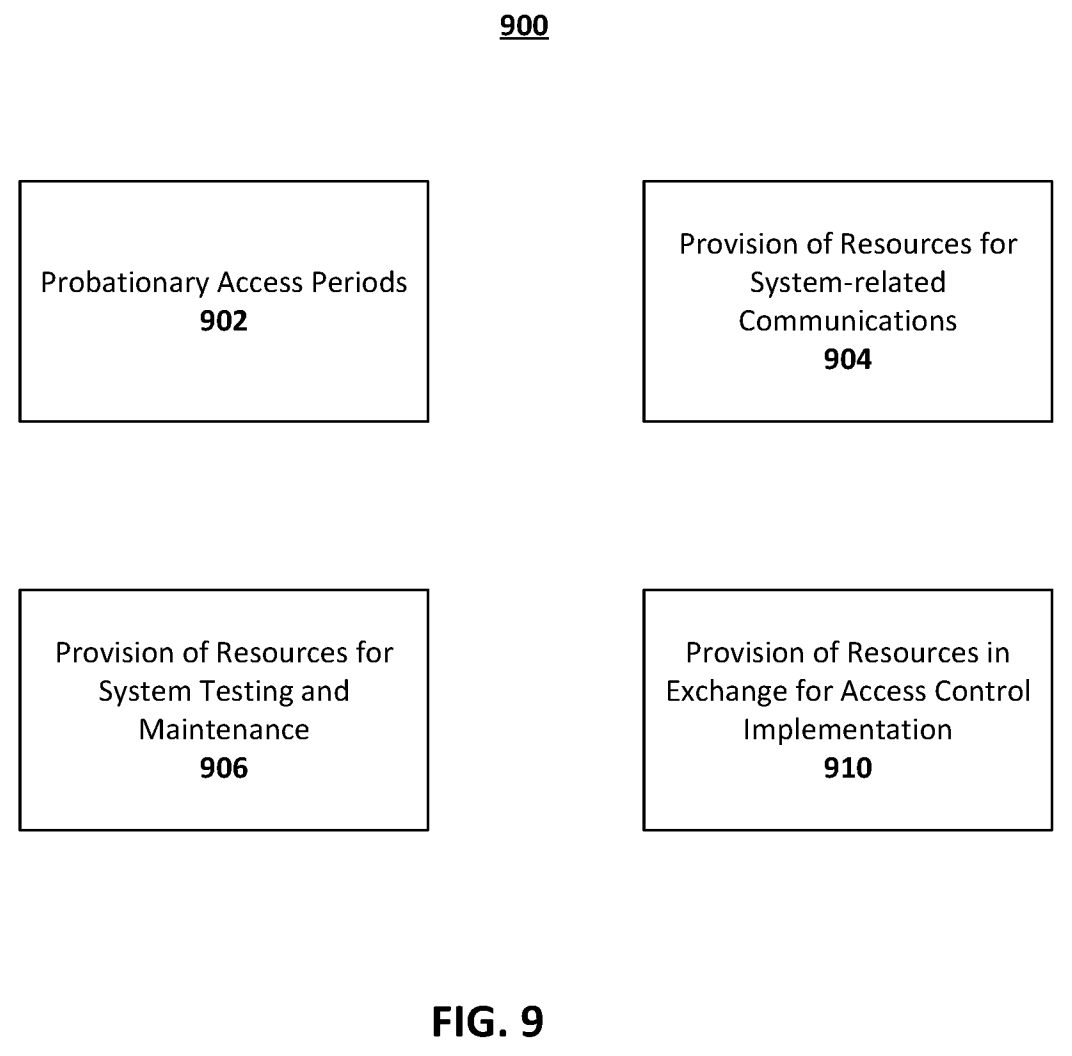

900

Probationary Access Periods 902

Provision of Resources for System-related Communications 904

Provision of Resources for System Testing and Maintenance 906

Provision of Resources in Exchange for Access Control Implementation 910

FIG. 9

SYSTEMS AND METHODS FOR MANAGING RESOURCE ACCESS PERMISSIONS

SUMMARY

The security of systems, such as computer networks, greatly benefits from strong user authentication and access control protocols. A computer system, such as a data storage system or a high-performance computing (HPC) system, may exclude malicious entities from unauthorized access to system resources. By doing so, a system may protect itself from abuse of resources or other security breaches, such as Trojan horse-type vulnerabilities. Particularly sensitive system resources, such as system administrator information, directories, computer processor allotments, or data, may be especially vulnerable to not only malicious attacks, but also harm due to incompetence or inexperience of other users in the system.

Accordingly, in some aspects, methods and systems are described herein for managing resource access permissions for users with unknown credentials. As one example, methods and systems are described herein for granting access for unknown or inexperienced users to only a subset of system resources, in order to protect the system from harmful or inappropriate user actions. For example, a user may request access to a particular amount of processing power (e.g., a particular number of central processing unit cores on a computing system). Upon collecting information related to previously requested and/or accessed resources by the user, the system may modify the subset of resources to which access is granted depending on the user's risk level, to allow that user demonstrating responsible access or use of system resources to be granted access to further resources. For example, a user that demonstrates considerable efficiency and trustworthiness with parallel computing resources across multiple cores without damaging or inefficiently occupying the computer system may be given a greater number of processing cores than a novice, who has not yet demonstrated efficient, responsible use of multi-core processors. Accordingly, the system disclosed herein may improve utilization of system resources while reducing risk associated with granting access to unknown users.

Existing systems may allocate resources to new users requesting access without sufficient information about the requesting user, thereby subjecting the system to potential misuse or exploitation of resources. For example, existing systems may provide resources, such as particular nodes or processors on a computing system, to users based on any pre-existing information regarding the users. Users may be associated with identification information and may already be known to system administrators and, as such, there may be a low system risk of granting access to such known users. In cases where pre-existing information regarding users is not available, however, systems may face a choice as to either exclude the user completely, leading to under-utilization of system resources, or enable the unknown user to access system resources at considerable risk to the system.

To solve this technical problem, existing systems may require new users to provide information regarding their own credentials, history, or trustworthiness. For example, system administrators may require new users to submit or retrieve from other sources contextual information regarding their behavior, qualifications and/or identity. Users may submit information regarding their previously accessed resources in other systems, such as previous tasks carried out on similar processing units, which may be subsequently evaluated by system administrators, such as by applying criteria or rulesets, or passing this information to artificial intelligence algorithms. However, for users without an extensive history or experience with similar system resources, it may be difficult for a system to determine trustworthiness or reputation, as there is insufficient information to analyze or evaluate the user's history. In these cases, the system may be unable to authenticate or validate the trustworthiness of such users and may be forced to deny access to system resources, even if such users may be trustworthy. Thus, conventional systems overlook or neglect potential users of the system that may be qualified or trustworthy due to a lack of previous data, thereby leading to inefficient use of system resources.

To overcome these technical deficiencies in system authentication, methods and systems disclosed herein enable the system to give new or unknown users access to a limited subset of system resources by placing such users in a relevant access control list, with an associated access level. The system may evaluate the users' behavior and activity within the access control list, such as through machine learning models, in order to determine a measure of risk associated with the user. Thus, the system may update the subset of resources accessible to the user after enough information is collected to establish the trustworthiness of the user. For example, the system may determine a measure of risk based on the user's interactions with the system using a machine learning model. Based on this calculated measure of risk, the system may determine whether the measure of risk exceeds a threshold measure of risk for a given access level, before determining whether to promote the user to another access control list for access to further resources. Accordingly, by enabling dynamic evaluation of users, the system may determine the trustworthiness of a user even if previous information was unavailable, thereby enabling the user to access additional resources while effectively countering the risk of any abuse of such resources.

In some embodiments, the system may receive, from a first user, a resource access request for a system with user credentials. For example, the system may receive, from the first user, a resource access request for a system, wherein the resource access request comprises a first user identifier and a first access level requested by the first user. In some embodiments, the system may receive a username, identification information (e.g., an identifier or another number), and/or personal identifiable information, such as a birthdate, given name and/or surname. Additionally, the user may provide a requested level of access to the system, such as a list of required system resources or an identifier of an access level. For example, the first user may provide a list of file systems or a value or amount of system resources that are desired (e.g., a storage size value in units of gigabytes). By receiving requests for system resource use, the system may evaluate and subsequently provide access to the system for users who have use for these resources. By receiving such requests, the system may evaluate them in order to maximize usage of resources, thereby improving the system's usage and efficiency, while opening itself to new use cases and user opportunities.

In some embodiments, the system may determine a measure of risk for the first user based on the user identifier. For example, based on the first user identifier, the system may determine a measure of risk associated with allocating resources to the first user. In a non-limiting example, the system may search for the user identifier corresponding to the first user in a database of known users. By doing so, the system may determine information that may enable an evaluation of the first user's risk or trustworthiness when accessing system resources. For example, the system may find information regarding the user's previous actions in other systems, such as previous resources accessed in such systems and corresponding timestamps, in order to determine whether the user has had experience in interacting with system resources of a similar nature. By doing so, the system may determine a measure of risk for the user. Where the system is not able to find enough information (e.g., for a user who is not associated with a given database, or where a user has not had experience accessing system resources in other systems), the system may determine the measure of risk to be a high value (e.g., above a threshold). By determining a measure of risk, the system may determine the risk of a user in accessing various system resources within the computing system. By doing so, the system may be able to determine how to protect a computing system against inexperienced or unvalidated users, while enabling experienced users to take full advantage of the system resources.

In some embodiments, the system may determine whether the first user may access the first access level. For example, the system may determine whether the first access level is permitted based on the measure of risk for the first user. In some embodiments, the system may determine a range of threshold measures of risk that may be suitable for the first access level (e.g., an access level requested by the first user within the resource access request). The system may determine where the first user's measure of risk falls within this range and, accordingly, determine whether the first user may be given access to the first access level. Thus, the system may allocate system resources to users based on the associated measures of risk and, as such, protect the system from malicious use while allowing and encouraging use of system resources according to the users' levels of experience and competence.

In some embodiments, the system may insert the user identifier in an access control list based on the first access level. For example, in response to determining that the first access level is permitted, the system may insert the first user identifier in a first access control list from a plurality of access control lists, thereby causing the first user to have access to a first resource. Having determined a first access level commensurate to the first user's measure of risk, the system may insert the user in an access control list that corresponds to this first access level. For example, the system may insert the user's identifier (e.g., username and/or other user credentials) in a list of other user identifiers that are all afforded access to a given system resource (e.g., a first resource). Thus, by placing the user in such an access control list, the system may control the resources that are accessible to the user and ensure that the user's access is consistent with the corresponding assigned access level. Accordingly, by utilizing access control lists, the system ensures that users are given access to resources within an acceptable risk level (e.g., within a threshold measure of risk).

In some embodiments, the system may receive information regarding the user's utilization of system resources. For example, at a subsequent time, the system may receive information regarding resources accessed by the first user. In some embodiments, the system may receive information regarding the system resources accessed by the user within the given computer system. For example, the system may receive a list of resources accessed, as well as a time stamp. In some embodiments, the information may include a value or size of accessed resources, such as a measure of storage usage in megabytes or gigabytes. In a non-limiting example, information regarding system resources that were attempted to be accessed by the user but were not allowed may be received as well. By receiving such information, the system may evaluate whether the user is behaving in a low-risk manner, or whether the user may be requesting resources in a risky manner. Thus, using this information, the system may dynamically evaluate the first user, in order to determine whether the user's assigned access level is appropriate.

In some embodiments, the system may determine an updated measure of risk based on this received information. For example, based on the received information, the system may determine an updated measure of risk associated with allocating resources to the first user. In some embodiments, the system may determine a measure of risk associated with the user's accessed resources (or, in some cases, resources for which access was requested but denied). For example, the first user may access resources in an efficient manner, without over-using system resources to the detriment of other users. In the case of system resources involving processors or processing time, a first user may demonstrate a low measure of risk by accessing resources in a predictable manner, without requesting large amounts of processing time all at once. On the other hand, if the first user demonstrates irresponsible use of system resources, such as by requesting a large percentage of system processing power all at once without parallelizing the tasks efficiently, the first user may exhibit an increased updated measure of risk. Thus, by evaluating resources accessed by the user, the system may determine an updated measure of risk associated with the user. Instead of relying entirely on external measures of risk (e.g., through an initial search of the user on a database of other system resources accessed by the user), the system may leverage internal information regarding the user's use of the present system's resources, thereby providing a more accurate, specific level of risk for the first user's use of the given computer system. Moreover, by generating an updated measure of risk for the user, the system may evaluate users for which little information existed prior to the conferral of system resource access. By doing so, the system may re-evaluate the access level that may be appropriate for a given user. Even if there is little risk information prior to the user's use of the present computer system, the system may generate a measure of risk based on this present use of system resources. For example, if a previously unknown user demonstrates efficient or responsible use of system resources, the system may determine that the user may have access to more complex or powerful resources, as this user may demonstrate a relatively low measure of risk.

In some embodiments, the system may determine to provide access to a second access level for the user based on this updated measure of risk. For example, the system may determine whether a second access level is permitted based on the updated measure of risk for the first user, wherein the second access level provides access to a second resource in addition to the first resource. In some embodiments, the system may determine whether the updated measure of risk still lies within a range of threshold measure of risk associated with the first access level. If not, the system may determine whether the updated measure of risk corresponds to another range of threshold measures of risk associated with a second access level, instead. By doing so, the system may determine whether the user's measure of risk may be different than was determined previously. As a result, the system may determine that the present access level conferred to the user is inappropriate (e.g., the present access level does not give the user sufficient access or, conversely, gives the user too much access to system resources, such that it is a risk to the system). Thus, the system may determine a new access level that is commensurate to the user's demonstrated behavior within the system. By doing so, the system may improve the efficiency and use of system resources, while mitigating against any risky users that are known for inefficient, risky or discourteous usage of system resources.

In some embodiments, the system may insert the first user identifier in a second access control list to give the first user access to the first and second resources. For example, in response to determining that the second access level is permitted, the system may insert the first user identifier in a second access control list from the plurality of access control lists, thereby causing the first user to have access to the second resource in addition to the first resource. In some embodiments, the system may determine an access list that provides access to resources that are commensurate to the user's updated access level. For example, the system may extract metadata for access control lists and identify an access control list that enables access to resources associated with a given access level. By doing so, the system enables the user to access resources according to their updated measure of risk, thereby improving the system's utilization of system resources while protecting risk-averse resources from users that have exhibited risky behavior.

In some embodiments, the system may determine parameters related to access to system resources based on both the system itself, as well as the specific circumstances of a particular access request for resources. For example, the system may gather system data that is relevant to a resource access request at the time of the resource access request. The system may translate the system data into inputs, which may subsequently be analyzed to develop parameters to control whether the user may access the system. By doing so, the system may dynamically adjust to system parameters in order to determine whether to provide access to a user, and which access level to provide to the user.

In some embodiments, the system may include a utility for determining the extent to which a system may gain efficiency based on providing access to system resources for users, and the extent to which these efficiency gains may outweigh system risk. By weighing the system efficiency due to user access with system risk as a function of access level provided to the user, the system may determine system benefit metrics for various access levels, thereby improving decisions to provide access to system resources for users.

In some embodiments, the system may provide additional features to enable implementation of a user access control system by mitigating issues with system efficiency upon implementing the access control system. For example, the system may provide probationary access periods, and provide resources for system-related communications, and for system testing and maintenance. Additionally, the system may provide resources in exchange for access control implementation. By doing so, the system may improve the implementation of access control lists in control and/or encouraging user access to system resources.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 1 shows an illustrative diagram of an access control list and associated metadata for controlling user access to system resources, in accordance with one or more embodiments.

FIG. 2 shows an illustrative diagram for a resource access history user database including information regarding resources accessed by users, in accordance with one or more embodiments.

FIG. 3 shows an illustrative diagram for required or prohibited actions associated with action control lists, in accordance with one or more embodiments.

FIG. 9 shows an illustrative diagram of system features that enable implementation of an access control system, in accordance with one or more embodiments.

DETAILED DESCRIPTION OF THE DRAWINGS

Figure 4:
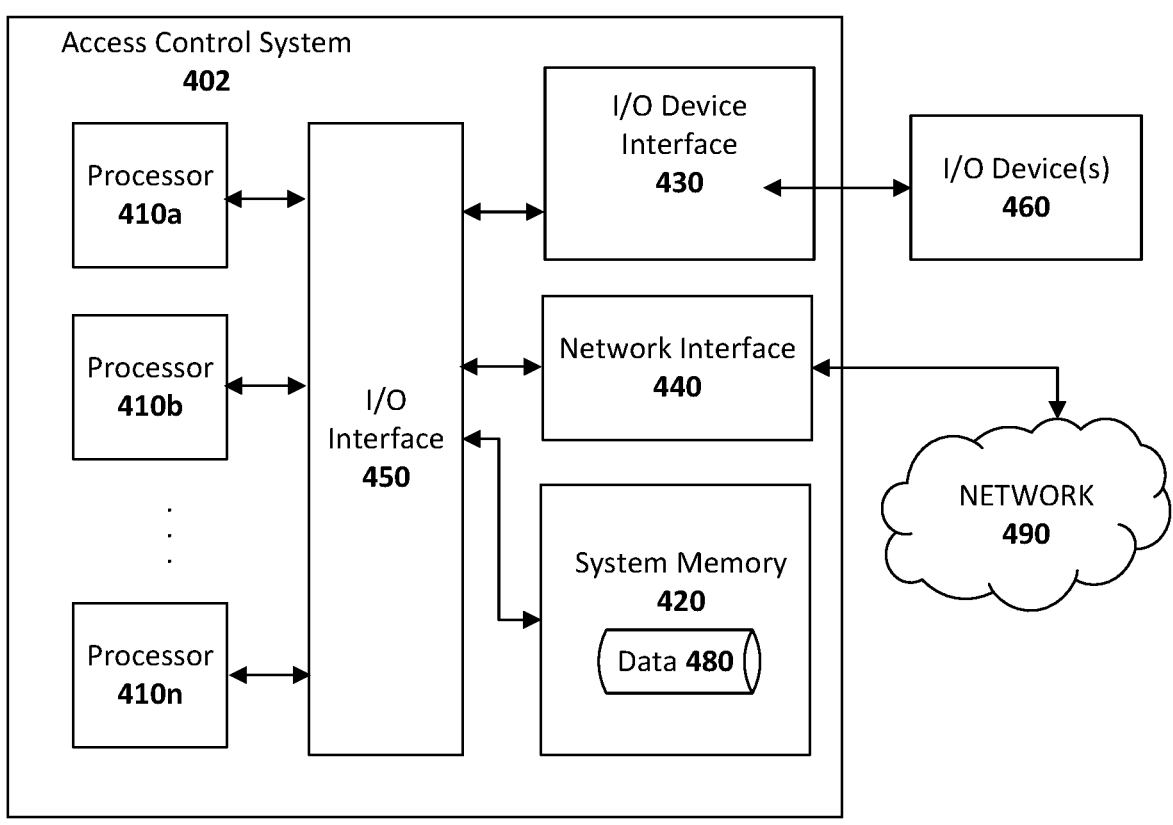
FIG. 4 shows illustrative components for a system used to control and evaluate user access to and utilization of system resources, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIG. 1 shows an illustrative diagram of an access control list and associated metadata for controlling user access to system resources, in accordance with one or more embodiments. For example, FIG. 1 describes access control list 100, associated with access control list identifier 102. Access control list 100 may comprise access control list members 104, such as a list of usernames 106, as well as control list insertion times 108, which may describe when username 106 was inserted into access control list 100. Additionally or alternatively, access control list 100 may be associated with access control list metadata 110. For example, access control list metadata 110 may include access level requirements 112, and/or a resource identifier of accessible resources 114.

Access control list 100 may be used to provide access to users of a data storage system. In disclosed embodiments, a data storage system may include physical devices and/or virtual devices for recording and preserving digital data. For example, a data storage system may be an interface that enables storage of information or data on a data storage medium, such as through cloud storage or through an interface with physical hardware. For example, a data storage system may include a system similar to Amazon Web Services or Google Drive. In some embodiments, a data storage system may include information or data that may be accessible or read from the data storage system. Users may be assigned system resources within a data storage system (e.g., an allotment of storage, such as a storage size in gigabytes or terabytes). In some embodiments, data storage systems may include information or data that is sensitive. For example, data storage systems may include file systems (e.g., individual files or directories) that may only be accessible to permissioned users, where such file systems may include sensitive information or resources that may be misused or harmful for inexperienced users. For example, a data storage system may only allow authorized users to access software or programs that may make modifications to the system itself, such as programs used to format hard disks or make other risky changes to the system. Thus, access control list 100 may enable the system to exclude inexperienced or risky users from making system changes, while enabling more experienced users to take advantage of more tools within the system.

Access control list 100 may enable users to access other systems, such as high performance computing (HPC) systems. In disclosed embodiments, HPC may include supercomputers, computer clusters, or computational architectures that enable parallel programming. For example, HPC may include systems that enable complicated calculations or operations, such as physical or engineering simulations. In some embodiments, HPC may include distributed clusters, such as systems that take advantage of cloud computing. In HPC systems, users may have significant control over physical and/or virtual parts of the system, as they may be highly customizable for the given computational application. For example, users may be able to select particular nodes, and determine how to use these nodes, such as through the selection of parallelization, hyperthreading, or other features. In some cases, utilizing certain configurations may break portions of the system, such as if a given task has not been configured properly. Thus, in disclosed embodiments, only experienced users may have access to certain features, nodes, or directories within an HPC system, in order to prevent the risk of any mistakes for system stability and/or use. Additionally, in some cases, only more experienced users may be able to determine more efficient methods for carrying out calculations, such as more efficient ways to parallelize or take advantage of hyperthreading. Thus, the system may prioritize more experienced users when allocating system resources, while limiting the resources that more inexperienced users take up, in order to improve the efficiency and utilization of system resources.

As noted above, the disclosed system may improve system utilization of resources. In disclosed embodiments, system utilization may include a measure of a percentage of available resources being used. For example, utilization may be measured as a function of a percentage of central processing unit or graphical processing unit resources being used (e.g., CPU or GPU usage). For example, CPU usage may include a percentage of an amount of elapsed time that has been used for processing instructions of a computer program or operating system. More experienced users may be more likely to utilize system resources more efficiently and, therefore, may exhibit higher CPU usage. However, if there are not enough users of the system, system utilization may be low, even if the users are experienced or efficient. Thus, the system may enable improvements to system utilization by allocating system resources to experienced users to improve efficiency of calculations that are carried out, while enabling more inexperienced users the opportunity to use the remaining resources in the system such that the resources are not completely unused. Thus, by enabling users to have increasing access to system resources as experience levels are established, the system may improve system utilization metrics and, therefore, improve the efficiency of the system.

In disclosed embodiments, an access control list may include a list of permissions associated with one or more system resources. For example, an access control list may specify users or processes that are granted access to objects, assets, or resources. In some embodiments, an access control list may include information regarding operations, processes or actions that are allowed with respect to a given resource. An access control list may specify, for example, that particular users (e.g., users specified by usernames 106) may access particular resources by including this list of usernames within the access control list. In some embodiments, an access control list may specify or identify resources that may be accessed by these users. For example, an access control list may specify resource identifiers 114, which may include filenames, process names, or indications (e.g., descriptions) of virtual, digital, or physical objects or assets that may be accessed by users on the access control list (e.g., users specified by usernames 106). In some embodiments, the access control list may specify resources such as lines of credit accessible to a user. For example, an access control list corresponding to a lower access level may specify that a user may purchase products only associated with a particular merchant (e.g., through a store-specific charge card) with a maximum amount of credit (e.g., a value of specified resources). Another access level may be accessible to the user, where the user may utilize, for example, a larger line of credit with a greater maximum amount of credit, or for a greater number of merchants (e.g., as is possible with a general-use credit card). By utilizing access control lists, the system may track and control whether users may be allowed to access resources based on their levels of trustworthiness, risk and/or experience. For example, by leveraging access control lists, the system may exclude riskier users from sensitive or large allotments of resources, while enabling more experienced, trustworthy users to use system resources in a manner that may improve system utilization.

Access control list 100 may include a list of usernames associated with users. In disclosed embodiments, a user may be an entity or person who may have access to or request access to the system. For example, a user may include an actor attempting physics simulations on an HPC system, or a person attempting to store digital information on a file storage system. In some embodiments, a user may include a person who may use (or apply for use of) a tool, instrument, or process, such as an account (including computing system accounts, banking or credit accounts) or a digital resource. In some embodiments, users may include or be associated with user identifiers, such as usernames 106 as shown in FIG. 1. A user identifier may include any identifier of a user, such as a birthdate, an identification moniker, a username, or an identification number (e.g., an individual taxpayer identification number or a social security number). For example, when submitting a resource access request, a user may include a user identifier, in order to identify themselves. By including and/or receiving user identifiers, the system may track users based on their requested resources, their experience or risk levels, and their access to different system components. For example, a user identifier may enable the system to look up and/or determine a measure of risk, based on actions associated with the user identifier either in the past or in the present, within or external to the system itself. Thus, the system may better evaluate users and, subsequently, control access to resources for the users.

The system may receive resource access requests from users. For example, a resource access request may include a request for particular resources (e.g., system resources), such as digital storage space (e.g., an allotment of a number of gigabytes), or computational power (e.g., a number of nodes or processors to be given control over for a certain amount of time). In disclosed embodiments, a resource access request may include a message that includes a user identifier identifying the resource access request's sender. Thus, by receiving and tracking user identifiers associated with resource access requests, the system may evaluate the user's trustworthiness (e.g., through a measure of risk) based on the user identifier, such as by looking up the user identifier on a database of past resource allocations to the user.

The resource access request may include a request for the system to allocate resources. In disclosed embodiments, resources may include any virtual or physical object, asset, or material. For example, a resource may include a digital asset, such as a file, a directory within a file system, or data/information. In some embodiments, a resource may include access to a number of HPC processors, nodes, or cores (e.g., for a particular amount of time). Additionally and/or alternatively, a resource may include digital or physical resources, such as funds, items, or credit. By receiving requests for resources, the system may determine a risk level associated with conferring these resources to a user and determine a level of access for the user accordingly.

The system may determine an access level to which a user is permitted. In disclosed embodiments, an access level may be associated with users, resources and/or access control lists. An access level may include an indication of to what extent a given resource and/or access control list may be tolerant to risk (e.g., tolerant to allowing access to a risky user). For example, an access control list, such as access control list 100, may exhibit access level requirements 112 that specify access levels that a user must be admitted to prior to accepting the user into the access control list. For example, a user associated with "Access Level 1" may be able to access resources listed on access control list 100. However, a user associated with "Access Level 0" may not have access to access control list 100, as it is not a required access level. In some embodiments, an access level requirement associated with an access control list may include criteria, such as that an access level must be greater than a particular value (e.g., greater than zero). By associating users with access levels and determining access to resources through whether the user has a sufficient access level, the system may control users that may be riskier or unknown and ensure that such users are not conferred access to sensitive or extensive system resources, as this may be considerably risky for the system. However, more experienced users associated with higher access levels may be able to access more resources, thereby enabling utilization of system resources by those with sufficient experience or low enough risk. For example, in some cases, "Access Level 0" may specify that only purchases associated with particular merchants (or with a maximum monetary value) may be possible for a particular user with a corresponding credit account. Other access levels, such as "Access Level 1," may allow the user access to a greater number of merchants or a larger amount of credit.

In some embodiments, an access control list may include access control list identifier 102. For example, access control list identifier 102 includes an alphanumeric identifier of an access control list (such as "329092409" as shown in FIG. 1). The system may determine an access control list for a user based on the access control list identifier, ensuring that the system may quickly identify and access relevant access control lists. In some embodiments, the access control list may include resource identifiers, such as resource IDs of accessible resources 114, which may describe which resources are accessible to a member of a given access control list. For example, a resource ID may include an alphanumeric identifier or code describing a resource, such as a code describing a particular processor in an HPC system. In some embodiments, a resource ID may include a directory name, a file name, or a database identifier. In some embodiments, a resource ID may include an indication of an amount of funds, currencies, or credit that a member of a given access control list may be given access to. By specifying resource identifiers and associating them with access control lists, the system may determine whether a user may be given access to a given resource based on their inclusion on an appropriate access control list.

In disclosed embodiments, the system may add or remove a user identifier in an access control list based on a probationary period of time. A probationary period of time (or, alternatively or additionally, a probationary time period or an elapsed probationary time period) may include a period of elapsed time for which a user may be evaluated, such as for a measure of risk (or an updated measure of risk). For example, having determined that a user requesting access to system resources is not sufficiently experienced or known to be able to determine a low associated measure of risk, the system may determine to add the user to an access control list for a pre-determined period of time (e.g., a probationary period of time). During this probationary period of time, the system may collect information regarding the user's use of the system and, based on this received information, may determine whether to remove the user from the relevant access control list (thereby revoking access to associated resources). In some embodiments, the system may enable the user to have access to resources by allowing the user's indefinite inclusion on the access control list based on received information during the probationary period of time. Alternatively or additionally, if the user exhibits a relatively high measure of risk (e.g., greater than a threshold measure of risk) during the probationary period of time, the system may automatically remove the user from the associated access control list and, therefore, revoke the user's access to associated resources. By doing so, the system may prevent further risk and/or system loss or damage beyond the probationary period of time.

FIG. 2 shows an illustrative diagram for a resource access history database including information regarding resources accessed by users, in accordance with one or more embodiments. For example, resource access history database 202 may be an example of a user database, which may include any collection of data (e.g., a data structure) that includes information relating to users and/or user identifiers. For example, FIG. 2 describes data structure 200 comprising user resource access history that may be accessible through resource access history database 202. Resource access history database 202 may include information regarding users (e.g., as identified by user identifiers 204 or 212), including resources or actions they may have taken with relation to the system. For example, resource access history database 202 may include a list of actions accessed by a user associated with user identifier 204 (e.g., actions 206), as well as any related resources that have been accessed (e.g., resource identifiers 208), and/or timestamps of when the action was performed and/or when the resource was accessed (e.g., timestamps 210). In some embodiments, the system may include such information regarding another user, such as a user identified by user identifier 212. For example, the system may include actions 214, resource identifiers 216 and/or timestamps 218 corresponding to the actions or resources. By including information regarding user behavior and actions within resource access history database 202, the system may track how a user interacts with the system and, therefore, evaluate users' trustworthiness. For example, the system may make a determination as to the measure of risk that a user may have based on such information.

In disclosed embodiments, the system receives information regarding resources accessed by users. For example, the system may receive information included in resource access history database 202, such as user access histories, event timestamps, or resource access events. Received information may include any information regarding actions or behavior related to the user, internal or external to the system, such as information extracted from system logs. In some embodiments, received information may include communications or transactions related to the user, such as transmissions of messages or resources. For example, such received information may include actions 206 or 214, such as requests to access resources (including requests to read or write resources, such as files). Additionally or alternatively, received information may include communication information, such as file transfers or file transfer requests. For example, received information may include requests to execute processes or utilize processors, as well as metadata relating to their use of resources. By receiving such information, the system may evaluate and determine the trustworthiness of users, such as the efficiency with which they utilize resources. A user may be evaluated based on how these resources are used, and may be measured against requirements or prohibited actions. By doing so, the system may dynamically change access levels (e.g., or accessible resources) for users based on their exhibited behavior, even if such behavior was not available earlier. Thus, the system may enable evaluation and subsequent handling of previously unknown or inexperienced users, in order to mitigate any risk associated with such users. The information received related to users may include a user access history. In disclosed embodiments, a user access history may include information regarding one or more users' actions, behavior, and/or actions directed towards the user relating to access to resources. For example, a user access history may include information within a resource access history database relating to what resources a user accessed, such as resource access events. In some embodiments, the user access history may include resource access events, which may include actions or events related to user access to particular resources. For example, a resource access event may include a description or an identifier of a resource accessed, such as an identifier of a processor that was controlled or utilized by the user, and may include an event timestamp describing when the access event occurred. In some embodiments, the event timestamp may include a range or list of times at which the resource was utilized. A resource access event may include any action, event, or situation describing access (or denial of access) to any resource. For example, a resource access event can include access of a cluster on an HPC system at a particular time. In some embodiments, a resource access event can include a purchase, such as a purchase using a bank card associated with a credit account. For example, a resource access event may also include a failure to complete an action by a deadline. For example, a resource access event may include a failure to update a readme file before deployment of a feature, or a failure to pay back a particular amount of debt associated with a credit account by a deadline. By recording events during which users accessed resources, the system may evaluate the extent to which users are utilizing resources in a non-risky, responsible, or trustworthy manner. Thus, the system may take further decisions to exclude or provide access to resources for a given user based on the received information, user access history, or resource access events.

In disclosed embodiments, a measure of risk may include a qualitative and/or quantitative measure of a user's expected behavior. For example, a measure of risk may include an indication of a probability that a given user will damage the system within a set time period or may include an indication of a value of resources expected to be wasted or lost. In some embodiments, a measure of risk may include a ranking of how experienced a user is within the system, where an inexperienced user who has used the system for little time may have a lower ranking (and, thus, a larger value of rank and subsequent measure of risk) than an experienced user who has used the system for a lot of time. In some embodiments, a measure of risk may be calculated based on received information, where the received information including indications of previous experience in other systems or situations. For example, a measure of risk may be calculated based on a user's reputation or rating as independently calculated by an external agency (e.g., based on a researcher's h-index, a credit rating, or another public metric). In some embodiments, the system may calculate an updated measure of risk based on a user's usage of the present system, such as through information about a user's actions as directed towards system resources. Such actions may be listed on resource access history database 202 or another database of user behavior, actions, or resource use. The updated measure of risk may be calculated using a machine learning model, where the machine learning model may be trained to determine a measure of risk based on the user's actions or behavior. By enabling a calculation of an updated measure of risk, the system may determine a user's trustworthiness and whether the user may be capable of accessing more system resources without substantial risk to the system or risk of loss. Thus, even users for whom prior information regarding behavior or reputation is not immediately available, the system may dynamically evaluate users and generate a measure of risk accordingly. Therefore, in some embodiments, the system may provide a manner with which to determine access of system resources for the user.

In some embodiments, the system may determine an access level corresponding to the user by comparing a user's measure of risk with one or more threshold measures of risk. In disclosed embodiments, a threshold measure of risk may include any criteria, rules, or requirements for granting a user access to an access level, such as based on a user's measure of risk. For example, a threshold measure of risk may include a maximum measure of risk that may be associated with a user, before which access to a particular access level is denied or revoked. As an illustrative, non-limiting example, the system may determine that a user has a measure of risk of 23%, indicating that the user may be 23% likely to cause system loss. A particular access level, such as "Access Level 1," may require a user to have a measure of risk of less than 30% (e.g., a maximum measure of risk) to have access to resources associated with the given access level. In some embodiments, the system may utilize multiple threshold measures of risk to determine whether a user is commensurate with a given access level. For example, "Access Level 1" may be associated with a lower threshold of 20% and a higher threshold of 30%, and the system may determine that the user's measure of risk is between the lower threshold and the higher threshold. By doing so, the system may define a Thus, the system may compare the user's measure of risk with the threshold measure of risk, which may include a maximum measure of risk, before determining to provide access of resources associated with an access level or access control list to a given user.

In some embodiments, the system may utilize machine learning models to generate predicted resource access events. The system may input information received regarding a user's access to resources in a machine learning model in order to generate predicted behavior that is characteristic of the user. For example, the system may input actions 206, resource identifiers 208 and timestamps 210 associated with user identifier 204 into a machine learning model and generate a prediction of future behavior. The system may train the machine learning model using analogous information related to other users. Thus, the system may determine whether a given user, based on their behavior and history of accessing resources, may pose a risk to the system. For example, based on the predicted resource access events generated, the system may determine a percentage or a likelihood that the user may perform actions resulting in harm or loss, such as a probability that a user will cause system loss. By doing so, the system may make an evaluation of an updated measure of risk for the user, thereby improving decisions relating to whether to confer access to given resources to a user. In some embodiments, based on a predicted resource access event that is harmful, the system may determine to limit access of a specific risky resource for the given user, while enabling the user to access other resources that do not pose such a risk. By doing so, the system confers flexibility in access control for users based on their predicted risky behavior.

As an illustrative example, users of particular products, such as customers who shop at particular merchants, may benefit from such an access control system. In some embodiments, a customer who wishes to apply for a credit card associated with a particular merchant may apply (e.g., through submitting a resource access request, such as a credit card application). The associated resource access request may include information relating to the user requesting the credit, such as prior credit payment history, a user identifier, such as a social security number, or other information about the user's creditworthiness. The system may approve access to the requested resource by, for example, issuing a merchant-affiliated credit card. In some embodiments, resources that may be provided to users include "Buy Now, Pay Later" accounts, which act as short-term financing enabling users to borrow resources for payment at a later date. In some embodiments, resources provided to users can include credit in the form of installment loans.

However, if the user's credit payment history, or related information, is unsatisfactory or missing, in some embodiments, the system may decline the resource access request and instead provide the customer with access to a graduation funnel. The graduation funnel may enable access to limited lines of credit (such as a line of credit only accessible within a particular merchant), for example, through inclusion of the customer within a corresponding access control list. For example, the line of credit may be a "buy-now, pay-later" loan or an installment loan. The system may track whether the user (e.g., the customer) successfully repays any loans or debts accrued through the graduation funnel (e.g., whether or not the customer completes a required task). In some embodiments, the system may determine whether the customer has undertaken any prohibited acts, such as a failure to pay back loans after a certain date, or a request to borrow beyond a maximum amount. By evaluating the user's actions on this less risky line of credit, the system may determine whether the customer may be eligible to graduate to the merchant-affiliated credit card based on evaluation of the user's behavior under the more limited line of credit. By doing so, the system may evaluate customers' creditworthiness, even if such information is not immediately accessible or favorable at first, thereby providing alternative payment methods for customers who would otherwise be denied such payment tools.

FIG. 3 shows an illustrative diagram for required or prohibited actions associated with action control lists, in accordance with one or more embodiments. For example, FIG. 3 illustrates data structure 300 for required action database 302 associated with an access control list (e.g., with access control list identifier 304 or 312). For example, required action database 302 may include actions 306 or 314 that are associated with an action type (e.g., action type 310 or 318) and that may be associated with particular resources (e.g., resources identified by resource identifiers 308 or 316). An action may include a request to access a resource, or may include requests for writing, reading, or transferring resources such as files. By maintaining, reading, or writing a required action database 302, the system may determine actions that are deemed acceptable or unacceptable (e.g., inappropriate) relating to an access control list, access level and/or a resource.

For example, required action database 302 may include actions 306 with action types 310 that specify required actions. In disclosed embodiments, a required action may include an action that is considered favorable, positive, or required for responsible use of the system. For example, a required action may specify that a user utilizing a resource (e.g., a resource identified by resource identifier 308) should request to read a file named "README.txt" as a favorable practice. In some embodiments, a required action may include any event, action, or transaction that may be seen as favorable. By comparing a user's actions with actions within a required action database, the system may determine whether a user is executing actions that may reflect as trustworthy or responsible, thereby enabling the user to demonstrate actions indicative of lower measures of risk. As an illustrative example, a required action may include one or more transactions with the purpose of returning resources that were borrowed from the system, such as funds or objects, thereby demonstrating responsible use of such resources. For example, a required action may include making a required payment on a debt associated with a line of credit (e.g., as associated with a given access level). Thus, the system may evaluate users' risk based on to what extent users perform required actions associated with access control lists to which the users belong. In some embodiments, the system may evaluate whether a user has completed required actions corresponding to alternative access control lists, such as access control lists of another access level. For example, the system may determine a percentage of required actions that are carried out by a given user and determine a measure of risk for the user accordingly. Thus, the system may evaluate whether a user is suitable for an updated measure of risk based on these required actions.

In some embodiments, action types 310 within required action database 302 may include an indication as to whether an action is a prohibited action. For example, a prohibited action may include actions that are not considered to be favorable for the system or may be deemed risky or harmful. For example, a prohibited action may include a request by a user to transfer a sensitive file from a protected directory to a public directory. In some embodiments, a prohibited action may include actions that are blocked or denied by the system. However, in some embodiments, a prohibited action may include an action that is not blocked or denied but may be considered risky. For example, such a risky action may include a request by a user for a quantity of resources that is deemed unreasonable by the system (e.g., requesting a purchase that is greater is allowable by a line of credit associated with the respective access level), or that may be at risk of causing system failure. By determining actions associated with an access control list that are considered to be prohibited or risky for users to execute, the system may evaluate the trustworthiness or risk of users' actions by, for example, tracking to what extent the users are performing or attempting to perform prohibited or risky actions. For example, the system may calculate a percentage of risky actions that are carried out by the user and determine a measure of risk based on this percentage.

FIG. 4 shows illustrative components for a system used to control and evaluate user access to and utilization of system resources, in accordance with one or more embodiments of this disclosure. For example, FIG. 4 shows computing system 400, which may include access control system 402. The components of FIG. 4 may be used to perform some or all operations discussed in relation to FIGS. 1-3. Furthermore, various portions of the systems and methods described herein may include or be executed on one or more computer systems similar to access control system 402. Further, processes and modules described herein may be executed by one or more processing systems similar to that of access control system 402.

Computing system 400 may include access control system 402, which may interact with input/output (I/O) device(s) 460, and network 490. Network 490 may be connected to one or more devices, such as mobile devices, user terminals, or other computing devices. Access control system 402 may include one or more processors (e.g., processors 410a-410n) coupled to system memory 420, an I/O device interface 430, and a network interface 440 via an I/O interface 450.

A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of access control system 402. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 420). Access control system 402 may be terminal a uni-processor system including one processor (e.g., processor(s) 410a-410n), or a multi-processor system including any number of suitable processors (e.g., 410a-410n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus may also be implemented as, special purpose logic circuitry, for example, an FPGA (field-programmable gate array) or an ASIC (application-specific IC). Access control system 402 may include a plurality of computing devices (e.g., distributed computer systems) to implement various processing functions.

I/O device interface 430 may provide an interface for connection of one or more I/O devices 460 to access control system 402. I/O devices may include devices that receive input (e.g., from a user) or output information (e.g., to a user). I/O devices 460 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 460 may be connected to access control system 402 through a wired or wireless connection. I/O devices 460 may be connected to access control system 402 from a remote location. I/O devices 460 located on remote computer systems, for example, may be connected to access control system 402 via a network and network interface 440.

Network interface 440 may include a network adapter that provides for connection of access control system 402 to a network. Network interface 440 may facilitate data exchange between access control system 402 and other devices connected to the network. Network interface 440 may support wired or wireless communication. The network may include an electronic communication network, such as the Internet, a local area network (LAN), a wide area network (WAN), a cellular communications network, or the like.

System memory 420 may be configured to store program instructions or data 480. For example, data 480 may include information relating to users, access control lists, or required actions associated with access control lists. For example, data 480 may include access control list 100, resource access history database 202 (e.g., data structure 200), and/or required action database 302. Program instructions may be executable by a processor (e.g., one or more of processors 410a-410n or 414) to implement one or more embodiments of the present techniques. Program instructions may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 420 (e.g., a storage device) may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. Non-transitory, computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 420 may include a non-transitory, computer-readable storage medium that may have program instructions stored thereon that are executable by a computer processor (e.g., one or more of processors 410*a*-410*n*) to cause the subject matter and the functional operations described herein. A memory (e.g., system memory 420) may include a single memory device and/or a plurality of memory devices (e.g., distributed memory devices).

I/O interface 450 may be configured to coordinate I/O traffic between processors 410*a*-410*n*, system memory 420, network interface 440, I/O devices 460, and/or other peripheral devices. I/O interface 450 may perform protocol, timing, or other data transformations to convert data signals from one component (e.g., system memory 420) into a format suitable for use by another component (e.g., processors 410*a*-410*n* or processor(s) 414). I/O interface 450 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of access control system 402, or multiple access control systems 402 configured to host different portions or instances of embodiments. Multiple access control systems 402 may provide for parallel or sequential processing/execution of one or more portions of the techniques described herein.

Those skilled in the art will appreciate that access control system 402 is merely illustrative and is not intended to limit the scope of the techniques described herein. Access control system 402 may include any combination of devices or software that may perform or otherwise provide for the performance of the techniques described herein. For example, access control system 402 may include or be a combination of a cloud computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Access control system 402 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Figure 5:
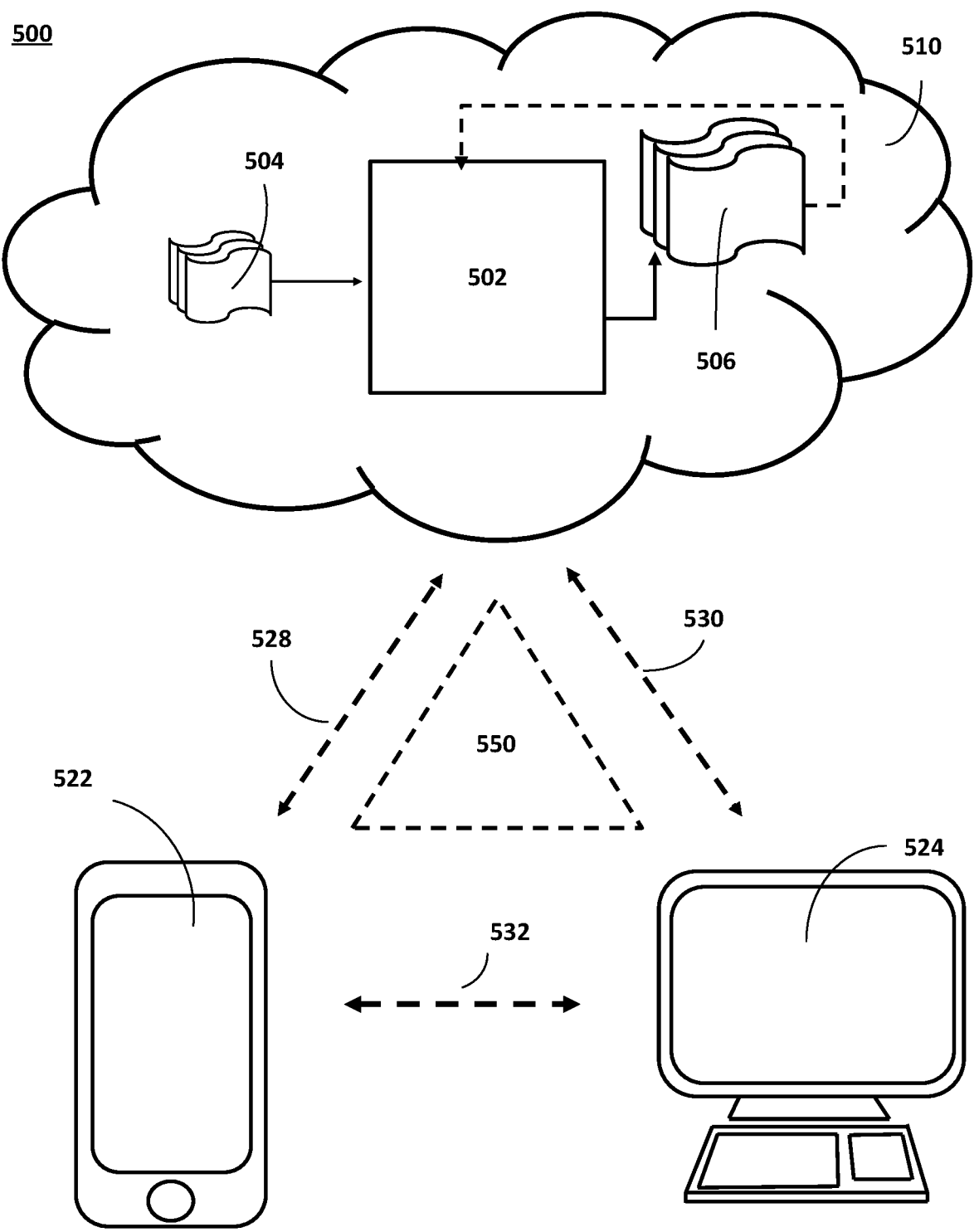
FIG. 5 shows an illustrative diagram for user access to a computational system, in accordance with one or more embodiments.

FIG. 5 shows an illustrative diagram for user access to a computational system, in accordance with one or more embodiments disclosed herein. For example, FIG. 5 may show illustrative components for evaluating new or unknown users for access to resources based on received information regarding user behavior and associated measures of risk. As shown in FIG. 5, system 500 may include mobile device 522 and terminal 524. For example, terminal 524 may correspond to or interface with access control system 402. While shown as a smartphone and personal computer, respectively, in FIG. 5, it should be noted that mobile device 522 and terminal 524 may be any computing device, including, but not limited to, a laptop computer, a tablet computer, a handheld computer, and other computer equipment (e.g., a server), including "smart," wireless, wearable, and/or mobile devices.

FIG. 5 also includes cloud components 510. For example, cloud components 510 may include or connect to a network (e.g., a payment network) or a server. Cloud components 510 may alternatively be any computing device as described above, and may include any type of mobile terminal, fixed terminal, or other device. For example, cloud components 510 may be implemented as a cloud computing system and may feature one or more component devices. It should also be noted that system 500 is not limited to three devices. Users may, for instance, utilize one or more devices to interact with one another, one or more servers, or other components of system 500. For example, cloud components 510 may include servers 502 or 504, as well as user device 506. It should be noted that, while one or more operations are described herein as being performed by particular components of system 500, these operations may, in some embodiments, be performed by other components of system 500. As an example, while one or more operations are described herein as being performed by components of mobile device 522, these operations may, in some embodiments, be performed by components of cloud components 510. In some embodiments, the various computers and systems described herein may include one or more computing devices that are programmed to perform the described functions. Additionally, or alternatively, multiple users may interact with system 500 and/or one or more components of system 500. For example, in one embodiment, a first user and a second user may interact with system 500 using two different components.

With respect to the components of mobile device 522, terminal 524, and cloud components 510, each of these devices may receive content and data via I/O paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 5, both mobile device 522 and terminal 524 include a display upon which to display data (e.g., conversational response, queries, and/or notifications).

Additionally, as mobile device 522 and terminal 524 are shown as a smartphone and personal computer, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 500 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 5 also includes communication paths 528, 530, and 532. Communication paths 528, 530, and 532 may include the Internet, a mobile phone network, a mobile voice or data network (e.g., a 5G or LTE network), a cable network, a public switched telephone network, or other types of communications networks or combinations of communications networks. Communication paths 528, 530, and 532 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 510 may include servers, computing devices, local area networks, or mobile devices. For example, cloud components 510 may include servers 502 or 504, as well as user device 506. Cloud components 510 may access one or more blockchain networks. Additionally, cloud components 510 may have access to access control lists and other information related to user data and behavior, such as user access history, resource access history databases, user identifiers, and/or associated required action databases. In some embodiments, cloud components 510 may access information relating to user behavior logs, such as in external systems, and/or databases of user risk external to the system, in addition to within the system.

Cloud components 510 may include a model, which may be a machine learning model, artificial intelligence model, deep learning model, etc. (which may be referred collectively as "models" herein). The model may take inputs and provide outputs. The inputs may include multiple datasets, such as a training dataset and a test dataset. Each of the plurality of datasets (e.g., inputs) include data subsets related to user data, predicted forecasts and/or errors, and/or actual forecasts and/or errors. In some embodiments, outputs may be fed back to the model as input to train the model (e.g., alone or in conjunction with user indications of the accuracy of outputs, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., predicted resource access events, such as whether a user may be likely to perform risky actions or tasks).

In a variety of embodiments, the model may update its configurations (e.g., weights, biases, or other parameters) based on the assessment of its prediction (e.g., outputs) and reference feedback information (e.g., user indication of accuracy, reference labels, or other information). In a variety of embodiments where the model is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model may be trained to generate better predictions.

In some embodiments, the model may include an artificial neural network. In such embodiments, the model may include an input layer and one or more hidden layers. Each neural unit of the model may be connected with many other neural units of the model. Such connections may be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. The model may be self-learning and trained, rather than explicitly programmed, and may perform significantly better in certain areas of problem solving, as compared to traditional computer programs. During training, an output layer of the model may correspond to a classification of the model, and an input known to correspond to that classification may be input into an input layer of the model during training. During testing, an input without a known classification may be input into the input layer, and a determined classification may be output.

In some embodiments, the model may include multiple layers (e.g., where a signal path traverses from front layers to back layers). In some embodiments, back propagation techniques may be utilized by the model where forward stimulation is used to reset weights on the "front" neural units. In some embodiments, stimulation and inhibition for the model may be more free-flowing, with connections interacting in a more chaotic and complex fashion. During testing, an output layer of the model may indicate whether or not a given input corresponds to a classification of the model (e.g., whether a response signal likely corresponds to a particular interception device).

In some embodiments, the model may automatically perform actions based on outputs. In some embodiments, the model may not perform any actions. The output of the model may be used to determine whether to include a user in a given access control list and/or provide access to system resources based on a user's calculated measure of risk or associated access level.

System 500 also includes API layer 550. API layer 550 may allow the system to generate summaries across different devices. In some embodiments, API layer 550 may be implemented on mobile device 522 or terminal 524. Alternatively or additionally, API layer 550 may reside on one or more of cloud components 510. API layer 550 (which may be A REST or Web services API layer) may provide a decoupled interface to data and/or functionality of one or more applications. API layer 550 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 550 may use various architectural arrangements. For example, system 500 may be partially based on API layer 550, such that there is strong adoption of SOAP and RESTful Web services, using resources like Service Repository and Developer Portal, but with low governance, standardization, and separation of concerns. Alternatively, system 500 may be fully based on API layer 550, such that separation of concerns between layers like API layer 550, services, and applications are in place.

In some embodiments, the system architecture may use a microservice approach. Such systems may use two types of layers: Front-End Layer and Back-End Layer where microservices reside. In this kind of architecture, the role of the API layer 550 may provide integration between Front-End and Back-End. In such cases, API layer 550 may use RESTful APIs (exposition to front-end or even communication between microservices). API layer 550 may use AMQP (e.g., Kafka, RabbitMQ, etc.). API layer 550 may use incipient usage of new communications protocols such as gRPC, Thrift, etc.

In some embodiments, the system architecture may use an open API approach. In such cases, API layer 550 may use commercial or open source API platforms and their modules. API layer 550 may use a developer portal. API layer 550 may use strong security constraints applying WAF and DDOS protection, and API layer 550 may use RESTful APIs as standard for external integration.

Figure 6:
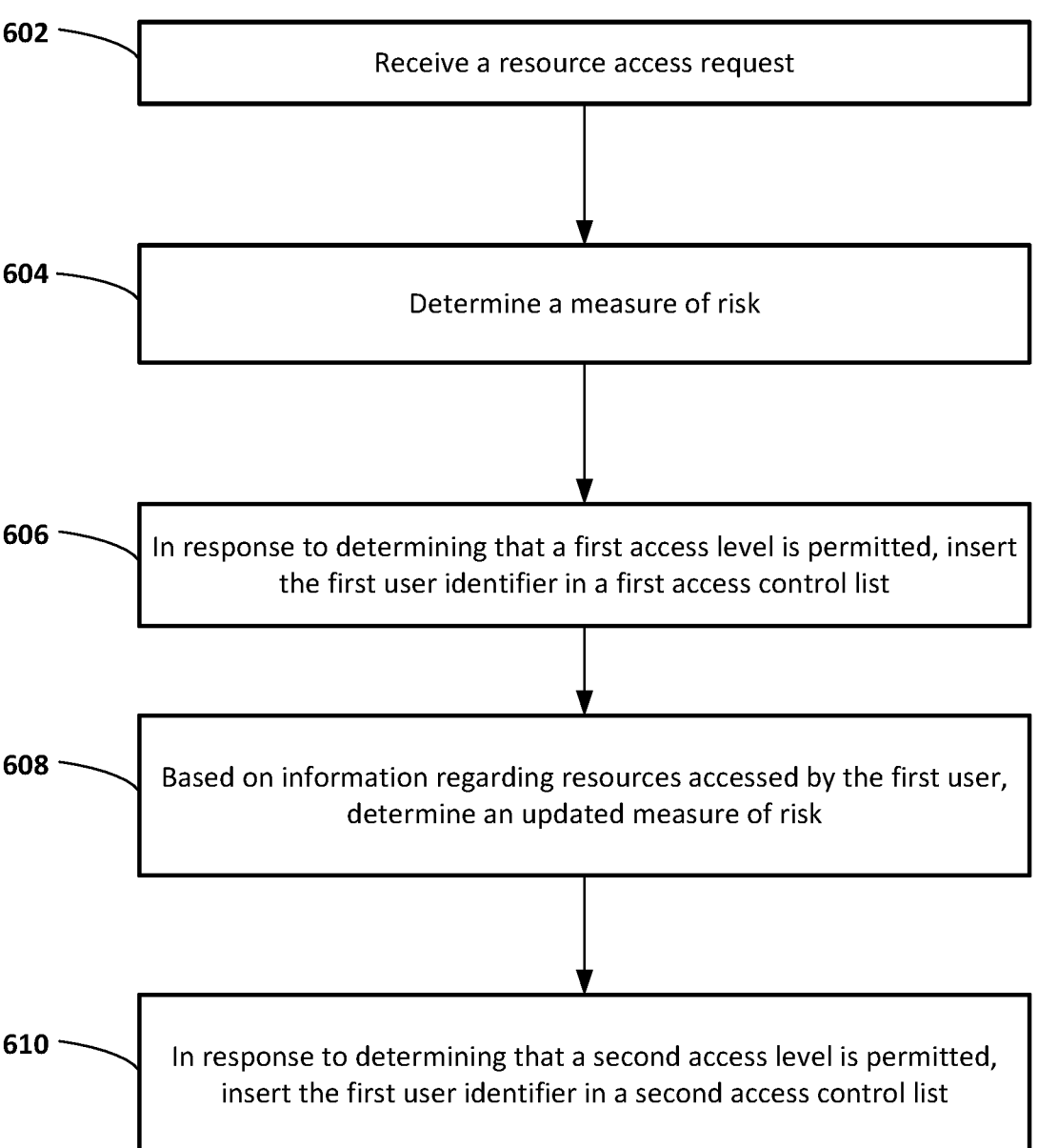
FIG. 6 shows a flowchart of the steps involved in granting user access to system resources within a computer system based on evaluating user actions, in accordance with one or more embodiments.

FIG. 6 shows a flowchart of the steps involved in granting user access to system resources within a computer system based on evaluating user actions, in accordance with one or more embodiments. For example, the system may use process 600 (e.g., as implemented on one or more system components described above) in order to limit user access to HPC computing resources, such as pocessors on distributed clusters, in order to mitigate the risk of system loss or failure based on inexperience, disrepute or incompetence of users.

At step 602, process 600 (e.g., using one or more components described above) enables system 500 to receive a resource access request for a user. For example, the system may receive, from a first user, a resource access request for a system, wherein the resource access request comprises a first user identifier and a first access level requested by the first user. In disclosed embodiments, the system may receive a request for particular system resources, such as particular processors within a HPC system for a particular amount of time. In some embodiments, the resource access request may include a request for a particular amount of a resource, such as a value of cryptocurrency or currency resources (or associated credit). The resource access request may be associated with a user, such as through a user identifier, and an access level may be specified by the user in some embodiments. Thus, the system may receive information that aids in determining whether a user corresponding to the user identifier may utilize the requested resources in an efficient or beneficial manner based on their experience level, risk, or other factors.

At step 604, process 600 (e.g., using one or more components described above) enables system 500 to determine a measure of risk for the user. For example, based on the first user identifier, the system may determine a measure of risk associated with allocating resources to the first user. In some embodiments, the system may search for the user identifier in databases of user information, such as user reputation, past behavior, or system actions. For example, the system may transmit a request for further user information regarding the user, such as the user's past actions, such as with respect to other HPC systems. The system may receive such information from the user or from other entities. In some embodiments, the system may determine a measure of risk based on the user's past access to other resources, such as through resource access history database 202. For example, the system may determine a number of required, prohibited and/or risky actions performed by the user (e.g., through required action database 302) in order to determine a measure of risk for the user based on such actions. However, for users where limited information exists, the system may assign a measure of risk based on the amount of information (or lack thereof) that is available. By determining a measure of risk, the system may evaluate whether to satisfy the user's request for resources based on the associated level of risk and/or trustworthiness.

In disclosed embodiments, the system may determine a measure of risk based on a user database and/or a resource access history. For example, based on the first user identifier, the system may determine the measure of risk associated with allocating resources to the first user. The system may access, from a user database (e.g., resource access history database 202), a resource access history corresponding to the first user identifier. Based on the resource access history, the system may determine a plurality of resource access events. Based on the plurality of resource access events, the system may determine the measure of risk associated with allocating resources to the first user. For example, the system may access a user database, such as resource access history database, that includes information regarding the user's behavior. In some embodiments, the user database may be external to the system and may detail interactions, behavior, or actions performed by the user outside of the system. Additionally or alternatively, a user database may include information regarding the user's actions associated with the system, such as access requests, write requests, read requests or transfer requests for resources associated with the system. The system may analyze these actions to determine a measure of risk. For example, the system may determine a measure of risk based on whether a user is likely to successfully parallelize an operation on an HPC system processor using the proper configuration, or whether the user has configured the processor in a risky or prohibited manner. By doing so, the system may improve the allotment of resources to the user in an efficient, risk-averse manner.

In some embodiments, the system may determine the measure of risk using a machine learning model. For example, the system may process, using a machine learning model, the plurality of resource access events to generate a plurality of predicted resource access events for the first user. Based on the plurality of predicted resource access events, the system may determine the measure of risk associated with allocating resources to the first user. For example, the system may update the measure of risk based on a machine learning model as further resource access events are received. In disclosed embodiments, the system may utilize a machine learning model to determine predicted user actions or user behavior based on a user's past actions (e.g., past actions from a user database of such actions). By determining predicted user actions, the system may determine whether a likelihood that a given user will perform risky or prohibited actions, or whether the user will perform required actions, as associated with resources accessed by the user. For example, the system may input prior actions extracted from a user database into the machine learning model and determine likely actions that the user will take (e.g., predicted resource access events). Based on these predicted events, the system may determine a likelihood that a user will, for example, perform a prohibited action as described in a required action database. By doing so, the system may determine a measure of risk for the user based on the user's past actions, thereby improving the accuracy of calculating a measure of risk for a user, as this determination is based on a user's proven behavior.

At step 606, process 600 (e.g., using one or more components described above) enables system 500 to, in response to determining that a first access level is permitted, insert the first user identifier in a first access control list. The system may receive, for a first user, a first access level permitted based on a measure of risk associated with allocating resources to the first user, wherein a first user identifier for the first user has been inserted in a first access control list from a plurality of access control lists, thereby causing the first user to have access to a first resource. For example, the system may determine whether the first access level is permitted based on the measure of risk for the first user. In response to determining that the first access level is permitted, the system may insert the first user identifier in a first access control list from a plurality of access control lists, thereby causing the first user to have access to a first resource. In disclosed embodiments, the system may determine whether the measure of risk is compatible with or commensurate with an access level. An access level may include a classification or determination of a user's ability to access resources. For example, an access level may include a categorization of the measure of risk, such as a categorization of the experience a user has with HPC computing and, therefore, may indicate a corresponding type or caliber of HPC system resources that may be accessible to the user. By determining whether an access level may be permitted for a user, the system may evaluate and categorize the user for determining resources that the user may access based on how risky the user may be. By doing so, the system enables mitigation of system loss or failure due to the provision of sensitive resources to risky users, while still enabling less risky, more experienced users to access resources in a manner that improves system utilization. The system may then place the corresponding user identifier in an access control list (e.g., access control list 100) in order to record that the user may be given access to resources associated with the access control list (e.g., resources with resource identifiers 114). Based on the user's inclusion in the access control list, the system may provide access to resources (e.g., a first resource) for the user. For example, the system may, upon receiving a request for access to a particular resource, determine an access control list associated with the resource and determine whether the user identifier of the user requesting access is included within the access control list. Thus, based on the measure of risk and corresponding access level, the system may determine whether a user may utilize resources based on the user's inclusion or exclusion from an associated access control list, thereby conferring improved control over user access to the system.

In some embodiments, may determine whether an access level is permitted for a user based on comparing the measure of risk with a threshold value. For example, the system may determine a first threshold measure of risk corresponding to the first access level, wherein the first threshold measure of risk indicates a maximum measure of risk for user access to the first resource. Based on comparing the first threshold measure of risk and the measure of risk, the system may determine whether the first access level is permitted. In disclosed embodiments, the system may determine whether an access level has requirements relating to users' measures of risk. For example, an access level may specify that a user must exhibit a measure of risk between a minimum and a maximum value (e.g., a threshold measure of risk). By doing so, the system may ensure that only users that are of a satisfactory level (e.g., a low enough risk, indicated by a low enough measure of risk) before being allocated resources corresponding to a given access level. Thus, the system may improve its stability and mitigate risk associated with risky users utilizing the system.

At step 608, process 600 (e.g., using one or more components described above) enables system 500 to, based on information regarding resources accessed by the first user, determine an updated measure of risk. At a subsequent time, the system may receive information regarding resources accessed by the first user. Based on the received information, the system may determine an updated measure of risk associated with allocating resources to the first user. In some embodiments, the information regarding resources accessed by the first user may be subsequent to the first user having access to the first resource. For example, the system may determine an updated measure of risk after a user has interacted with the system based on the determined access level and accessible resources. For example, the system may receive information relating to a user who was given access to time on a set of processors in an HPC system based on a resource access request. The system may evaluate the user's actions associated with the processors, such as the configurations employed in carrying out the user's tasks or processes, and/or whether the user was able to parallelize calculations effectively across the processors. Based on these user actions (e.g., resource access events), the system may update the measure of risk calculated previously in order to evaluate whether the user has utilized the current system in an effective, trustworthy, and risk-averse manner, for example. In some embodiments, the system may determine such an updated measure of risk by determining the extent to which the user returned any used or borrowed resources (e.g., to the initial state). By doing so, the system may determine whether the user is worthy of further or greater access to system resources, or whether doing so may represent a risk to the system.

In disclosed embodiments, the system may determine the updated measure of risk based on events or actions associated with resources accessed by the user. For example, the system may determine, from the information regarding resources accessed by the first user, a plurality of resource access events. Based on determining that the plurality of resource access events comprises a risky action and/or one or more required actions, the system may determine the updated measure of risk associated with allocating resources to the first user. In some embodiments, the system may receive information relating to a user's actions with respect to resources, such as through resource access history database 202. For example, the system may transmit a request with user identifier 204 and receive information regarding actions taken by the user corresponding to the user identifier (e.g., a plurality of resource access events), such as actions 206, as well as particular resources accessed (e.g., through resource identifiers 208), as well as event timestamps corresponding to when the actions were taken or when the corresponding resource(s) were accessed. As an illustrative example, the system may record read/write requests relating to files or configurations of the system. Based on such information relating to the user's access of resources, the system may determine the updated measure of risk, such as through a machine learning model. Thus, the system may improve the accuracy of measure of risk associated with users by dynamically tracking the users' behavior and updating the associated measure of risk accordingly.

At step 610, process 600 (e.g., using one or more components described above) enables system 500 to, in response to determining that a second access level is permitted, insert the first user identifier in a second access control list. For example, the system may determine whether a second access level is permitted based on the updated measure of risk for the first user, wherein the second access level provides access to a second resource in addition to the first resource. In response to determining that the first access level is permitted, the system may insert the first user identifier in a second access control list from the plurality of access control lists, thereby causing the first user to have access to the second resource in addition to the first resource. For example, based on a user's updated measure of risk, the system may determine whether the updated measure of risk is commensurate with a second access level (e.g., through comparing the updated measure of risk with a threshold, as discussed above for the first access level). In some embodiments, the second access level may exhibit different requirements to the first access level before permitting users. For example, a second access level may specify that the user, based on the updated measure of risk, may have access to more complex resources (e.g., more flexibly configurable processors in an HPC system), or a greater number or value of such resources. Based on the second access level, the system may include the user identifier in a relevant access control list, which may provide access to such resources. For example, the system may add the user into a list of access control list members, giving the user access to one or more resources that were previously inaccessible. By doing so, the system may learn from a user's behavior and leverage such information to make a better determination of how risky, trustworthy, or experienced a user is, and, accordingly, improve the way resources are allocated to the user. Moreover, the system may enable users that are previously unknown or inexperienced to prove their trustworthiness or, additionally or alternatively, demonstrate their riskiness or incompetence, over time through allocation of the first resource or inclusion in the first access control list. In response to user behavior, the system may update the measure of risk and, accordingly, update the resources accessible to the user, thereby enabling previously unknown or inexperienced users to utilize the system in a low-risk manner.

In some embodiments, the system may determine that a user has not performed a prohibited event for an elapsed probationary time period and, accordingly, enable a user to have access through an updated access control list. For example, the system may identify a first time corresponding to inserting the first user identifier in the first access control list. The system may determine a plurality of event timestamps, each event timestamp corresponding to each resource access event in the plurality of resource access events. Based on the plurality of event timestamps, the system may determine that, during an elapsed probationary time period from the first time, no resource access event in the plurality of resource access events includes a prohibited event from a plurality of prohibited events. Based on determining that no resource access event in the plurality of resource access events includes the prohibited event, the system may insert the first user identifier in the second access control list. For example, the system may record when a user was added to an access control list (e.g., shown through control list insertion time 108 in FIG. 1). The system may determine actions taken by the user from this time relating to accessing resources, such as by recording such actions (e.g., resource access events) in resource access history database 202. The system may determine whether any of these actions are prohibited or risky actions. In disclosed embodiments, a prohibited or risky action may include making a prohibited transfer of resources (e.g., a file) to an unauthorized user outside the system. Additionally or alternatively, a prohibited or risky action may include a user request for prohibited or restricted resources, such as a request to modify processors or files that are deemed critical to the system by a system administrator. For example, the system may compare the plurality of resource access events associated with the user with events listed within required action database 302, which may specify whether these actions were required or not, as well as whether they may be prohibited. The system may automatically add the user to another access control list (e.g., an access control list corresponding to a higher access level or to a lower threshold measure of risk) if the user has not performed such a prohibited or risky action during an elapsed probationary period of time. By doing so, the system may evaluate or measure a user based on whether they demonstrate a propensity to execute risky actions or not and, following such a trial period, the user may be given control after having proven that they are trustworthy. By doing so, the system may provide opportunities for users to increase access to resources (and, therefore, improve system utilization), while screening against users who demonstrate or exhibit risky behavior.

In some embodiments, the system may determine whether a second access level is permitted based on comparing the user's updated measure of risk with a threshold value. For example, the system may determine a second threshold measure of risk corresponding to the second access level, wherein the second threshold measure of risk indicates a maximum measure of risk for user access to the second resource. Based on comparing the second threshold measure of risk and the updated measure of risk, the system may determine that the second access level is permitted. For example, the system may determine, based on metadata associated with access levels and/or access control lists, requirements or threshold values for measure of risk for a user's inclusion in an access control list for access to resources, such as more powerful HPC-based processors (or, additionally or alternatively, for being granted permission to be in an associated access level). Thus, by determining an updated measure of risk and comparing this value with a threshold value, the system may determine an appropriate level of access commensurate to the user, in order to improve system utilization while mitigating risk of the user performing risky or prohibited actions.

In some embodiments, the system may determine that the first access level is not permitted based on the updated measure of risk. For example, based on determining that the first access level is not permitted based on the updated measure of risk for the first user, the system may cause the first user identifier to be removed from the first access control list, thereby causing the first user to lose access to the first resource. For example, the system may determine that a user has engaged in prohibited or risky behavior (or, additionally or alternatively, conversely has not engaged in a required action, such as returning an allocated resource in a satisfactory state). Thus, the system may determine that the user's updated measure of risk may be higher than previously. By making such a determination, the system may remove the user from an access control list that enables access to the first resource, thereby causing the first user to lose access to the first resource. Thus, the system may mitigate system risk by excluding users that demonstrate risky, prohibited or untrustworthy behavior, thereby improving system stability.

In disclosed embodiments, the system may enable a user to be associated with an access control list temporarily, for a probationary period of time. For example, based on the updated measure of risk, the system may insert the first user identifier into the second access control list at a first time. After a probationary period of time has elapsed beyond the first time, the system may cause the first user identifier to be removed from the second access control list, thereby causing the first user to lose access to the second resource. For example, the system may determine that, based on an updated measure of risk, a user may be eligible for an updated access level. In some embodiments, the user may have an updated measure of risk that may be considered borderline based on associated thresholds or requirements associated with the access level. For example, a user may have a measure of risk (either updated or otherwise) that is at a lower end of a range of allowed measures of risk associated with a particular access level and/or access control list. Thus, the system may update access for the user to the associated resources for a probationary period of time to further evaluate whether the user may be trustworthy, safe, or efficient in their use of a second resource associated with the updated access level. By doing so, the system may enable users to prove themselves and gain access to further system resources, even if they may be too risky for permanent access.

In some embodiments, the system may cause the first user to have access to a second resource but not a first resource based on insertion into a third access control list. For example, based on the updated measure of risk, the system may insert the first user identifier into a third access control list, thereby causing the first user to have access to the second resource and to lose access to the first resource. For example, the system may determine multiple measures of risk corresponding to the user based on different resource types or system types. For example, the system may determine that the user is likely competent or skilled at using processors (reflected by an updated measure of risk), but not at using system memory (reflected by another updated measure of risk). Thus, the system may determine to insert the user into an access control list that provides access to the user for a second resource but not a first. By doing so, the system may tune access to users in a manner that may improve system utilization of resources, while still mitigating against risk demonstrated by users.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

Figure 7:
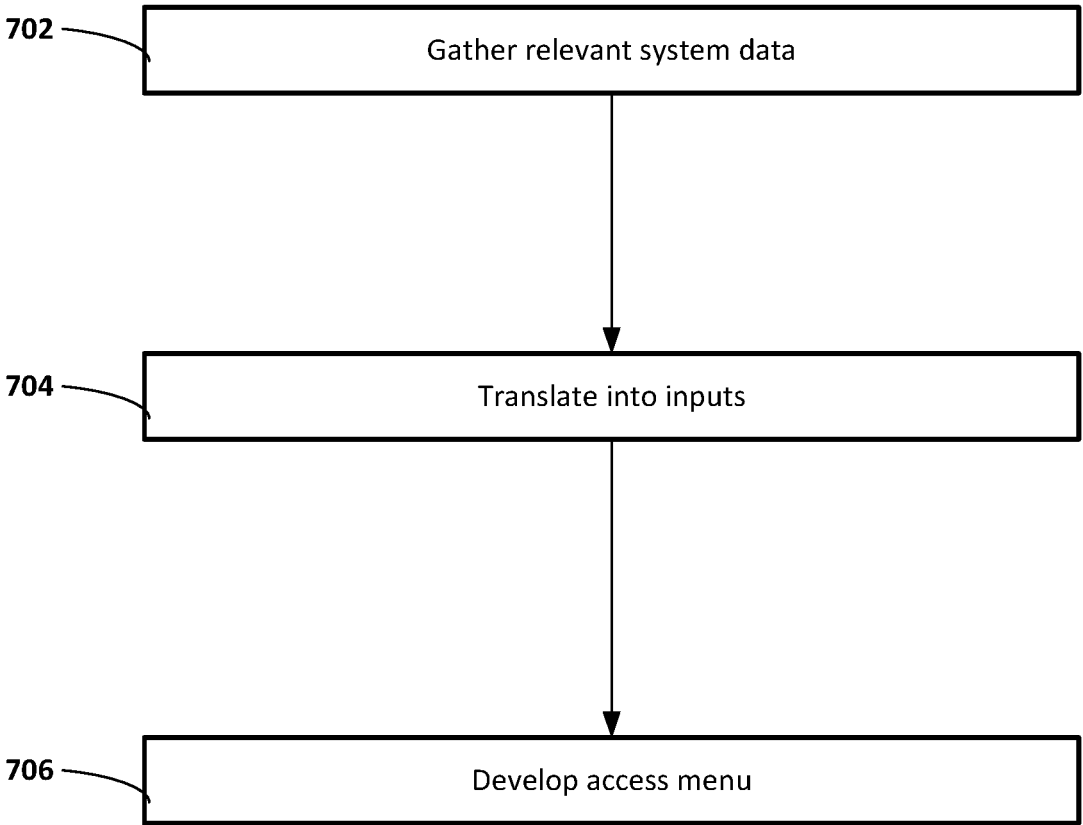
FIG. 7 shows an illustrative flowchart of steps for handling access requests to specific resources dynamically, in accordance with one or more embodiments.

FIG. 7 shows an illustrative flowchart of steps for handling access requests to specific resources dynamically, in accordance with one or more embodiments. For example, at step 702, process 700 (e.g., using one or more components described above) may gather relevant system data. In some embodiments, the system may determine system considerations relating to a user access request. For example, the system may determine and/or generate a system-wide user profile. For example, the system-wide user profile may correspond to a user base (e.g., a customer base for the system). In some embodiments, the system may generate a system-wide measure of risk for users, such as a credit profile. For example, the system may generate average resource request values (e.g., transaction sizes) based on variables, such as system usage, and determine access criteria (e.g., access control list requirements) based on this information. In some embodiments, the system may include other variables, including system-level (e.g., merchant-level) variables, including annual benefit metrics (e.g., annual revenue) and/or information about similar systems (e.g., industry verticals). Variables may include user-level variables, such as user risk profiles (e.g., credit profiles) or channels. Variables may include access request or resource-level variables (e.g., transaction-level variables), such as resource size (e.g., basket size) and/or the specified resource (e.g., product selection). By determining access control requirements (e.g., threshold measure of risk as related to access control lists and/or access levels), the system may better control access to resources dynamically and based on relevant variables, improving system security and utilization.

At step 704, process 700 (e.g., using one or more components described above) may translate system data into inputs. For example, the system may predict system risk metrics based on the variables determined above. For example, system risk metrics may include predicted risk or system risk, such as loss forecasts, average resource use allocations/sizes (e.g., average basket sizes), resource use lengths (e.g., product term lengths) and further user data. By determining system risk metrics, the system may better evaluate how to allocate resources on a case-by-case basis, improving system flexibility.

At step 706, process 700 (e.g., using one or more components described above) may develop an access menu, such as based on the system data and inputs. For example, the system may determine access control list metadata or access level metadata based on the system data and input s. For example, the system may determine available resources to a given user, as well as an associated access level, based on such information. By doing so, the system may improve the accuracy of measure of risk determinations and thereby improve the functioning of the system.

Figure 8:
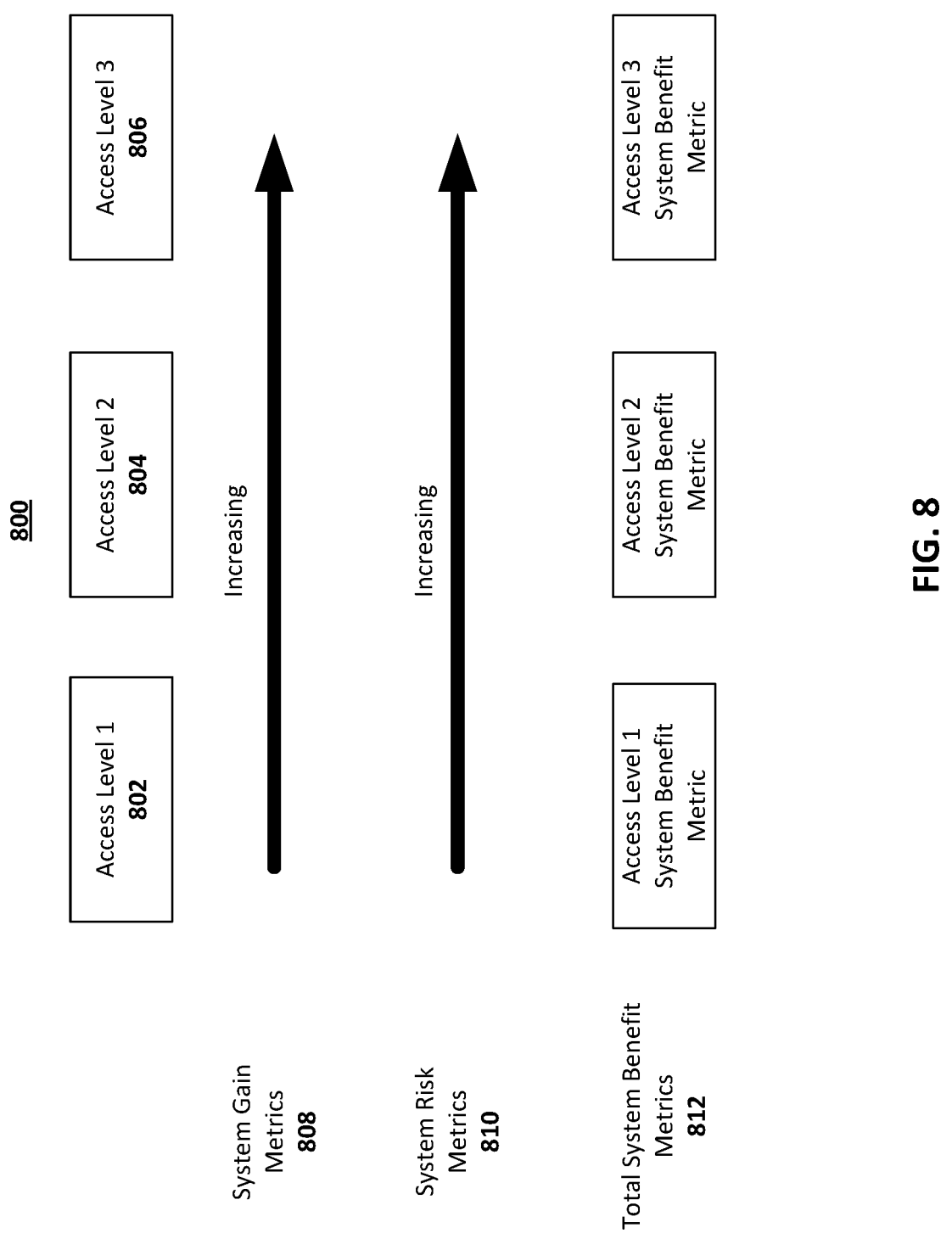
FIG. 8 shows an illustrative schematic of system gain and system risk determination as a function of access level conferral, in accordance with one or more embodiments.

FIG. 8 shows illustrative schematic 800 of system gain and system risk determination as a function of access level conferral, in accordance with one or more embodiments. For example, the system may calculate system gain metrics and/or system loss metrics based on predictions of user behavior from, for example, a machine learning model. In some embodiments, the system may generate metrics and/or recommendations based on system gain metrics and system loss metrics for display on a user interface. For example, the system may generate predicted system gain metrics 808 for access levels 802, 804, and 806. The system may generate system risk metrics 810 for access levels 802, 804, and 806. In some embodiments, additionally or alternatively, the system may generate total system benefit metrics 812 for each access level. For example, the system may calculate a metric based on a cost of offering a given payment tender incurred by a merchant, as well as a metric based on revenue or benefit due to enabling a given purchase or sale. By processing these amounts, the system may determine an overall benefit, such as a profit, and determine which payment methods may improve the lucrativeness of a given purchase. For example, the system may determine cost and revenue associated with a flexible payment solution, credit card payments, or debit card payments, in order to determine satisfactory options for completing purchases. By generating these metrics and displaying them, system administrators may make informed decisions about whether to provide access to users based on such predictions.

For example, variables that may be used in determining predicted system gain metrics, risk metrics and/or benefit metrics may include system-specific information (merchant-specific information), external information (e.g., systemic information), and or average user information. For example, system-specific information may include resource information (e.g., a total value of resources allocated, such a cost of goods sold). In some embodiments, merchant-specific resource information can include information regarding costs of sold goods, including transport or storage costs. The system may, additionally or alternatively, consider availability of resources (e.g., available tenders and associated costs). For example, the system can consider other valid payment methods and determine whether a customer's use of these may be less or more profitable. In some embodiments, the system may consider resource allocation costs (e.g., charge-back rates). For example, external information may include Fresource processing costs (e.g., debit processing costs).

FIG. 9 shows an illustrative diagram of system features 900 that enable implementation of an access control system, in accordance with one or more embodiments. For example, the system may implement probationary access periods 902. The system may provide resources for system related communications (e.g., provision 904), or resources for system testing and maintenance (e.g., provision 906). In some embodiments, the system may provide resources in exchange for access control implementation (e.g., provision 910). For example, the system may provide sign-on bonuses or other incentives for adopting an access control system (e.g., a credit system with varying access levels to lines of credit). For example, the system may determine probationary access periods 902 for system implementation of access control lists (e.g., trial periods). For example, the system may exhibit a trail period, where fees related to an access control system (e.g., a flexible payment system with variable accessible resources) may be waived, to encourage implementation of the system. In some embodiments, the system may provide resources for system-related communications to improve system utilization (e.g., marketing resources, or resources to encourage use of underused system resources). For example, the system may provide marketing funds to adopters of an access control system, such as for advertising. In some embodiments, the system may provide resources for system testing or maintenance (e.g., implementation resources). For example, the system may provide financial benefits for implementation of a flexible payment system, including reimbursement of any start-up related fees. In some embodiments, the system may provide resources in exchange for access control implementation (e.g., sign-on incentives).

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving, from a first user, a resource access request for a system, wherein the resource access request comprises a first user identifier and a first access level requested by the first user; based on the first user identifier, determining a measure of risk associated with allocating resources to the first user; determining whether the first access level is permitted based on the measure of risk for the first user; in response to determining that the first access level is permitted, inserting the first user identifier in a first access control list from a plurality of access control lists, thereby causing the first user to have access to a first resource; at a subsequent time, receiving information regarding resources accessed by the first user; based on the received information, determining an updated measure of risk associated with allocating resources to the first user; determining whether a second access level is permitted based on the updated measure of risk for the first user, wherein the second access level provides access to a second resource in addition to the first resource; and in response to determining that the second access level is permitted, inserting the first user identifier in a second access control list from the plurality of access control lists, thereby causing the first user to have access to the second resource in addition to the first resource.

2. A method, the method comprising: receiving, for a first user, a first access level permitted based on a measure of risk associated with allocating resources to the first user, wherein a first user identifier for the first user has been inserted in a first access control list from a plurality of access control lists, thereby causing the first user to have access to a first resource; based on information regarding resources accessed by the first user subsequent to the first user having access to the first resource, determining an updated measure of risk associated with allocating resources to the first user; and in response to determining that a second access level is permitted based on the updated measure of risk for the first user, inserting the first user identifier in a second access control list from the plurality of access control lists, thereby causing the first user to have access to a second resource in addition to the first resource.

3. A method, the method comprising: receiving, for a first user, a first access level permitted based on a measure of risk associated with allocating resources to the first user, the first user having access to a first resource; based on information regarding resources accessed by the first user subsequent to the first user having access to the first resource, determining an updated measure of risk associated with allocating resources to the first user; and in response to determining that a second access level is permitted based on the updated measure of risk for the first user, causing the first user to have access to a second resource in addition to the first resource.

4. The method of any one of the preceding embodiments, further comprising, based on the first user identifier, determining the measure of risk associated with allocating resources to the first user, comprising: accessing, from a user database, a resource access history corresponding to the first user identifier; based on the resource access history, determining a plurality of resource access events; and based on the plurality of resource access events, determining the measure of risk associated with allocating resources to the first user.

5. The method of any one of the preceding embodiments, wherein, based on the plurality of resource access events, determining the measure of risk associated with allocating resources to the first user comprises: processing, using a machine learning model, the plurality of resource access events to generate a plurality of predicted resource access events for the first user; and based on the plurality of predicted resource access events, determining the measure of risk associated with allocating resources to the first user.

6. The method of any one of the preceding embodiments, further comprising: identifying a first time corresponding to inserting the first user identifier in the first access control list; determining a plurality of event timestamps, each event timestamp corresponding to each resource access event in the plurality of resource access events; based on the plurality of event timestamps, determining that, during an elapsed probationary time period from the first time, no resource access event in the plurality of resource access events includes a prohibited event from a plurality of prohibited events; and based on determining that no resource access event in the plurality of resource access events includes the prohibited event, inserting the first user identifier in the second access control list.

7. The method of any one of the preceding embodiments, further comprising determining whether the first access level is permitted based on the measure of risk for the first user, comprising: determining a first threshold measure of risk corresponding to the first access level, wherein the first threshold measure of risk indicates a maximum measure of risk for user access to the first resource; and based on comparing the first threshold measure of risk and the measure of risk, determining whether the first access level is permitted.

8. The method of any one of the preceding embodiments, wherein determining the updated measure of risk associated with allocating resources to the first user comprises: determining, from the information regarding resources accessed by the first user, a plurality of resource access events; and based on determining that the plurality of resource access events comprises a risky action and/or one or more required actions, determining the updated measure of risk associated with allocating resources to the first user.

9. The method of any one of the preceding embodiments, wherein determining that the second access level is permitted based on the updated measure of risk for the first user comprises: determining a second threshold measure of risk corresponding to the second access level, wherein the second threshold measure of risk indicates a maximum measure of risk for user access to the second resource; and based on comparing the second threshold measure of risk and the updated measure of risk, determining that the second access level is permitted.

10. The method of any one of the preceding embodiments, further comprising: based on determining that the first access level is not permitted based on the updated measure of risk for the first user, causing the first user identifier to be removed from the first access control list, thereby causing the first user to lose access to the first resource.

11. The method of any one of the preceding embodiments, further comprising: based on the updated measure of risk, inserting the first user identifier into the second access control list at a first time; and after a probationary period of time has elapsed beyond the first time, causing the first user identifier to be removed from the second access control list, thereby causing the first user to lose access to the second resource.

12. The method of any one of the preceding embodiments further comprising: based on the updated measure of risk, inserting the first user identifier into a third access control list, thereby causing the first user to have access to the second resource and to lose access to the first resource.

11. A tangible, non-transitory, machine-readable medium storing instructions that, when executed by a data processing apparatus, cause the data processing apparatus to perform operations comprising those of any of embodiments 1-12.

12. A system comprising one or more processors; and memory storing instructions that, when executed by the processors, cause the processors to effectuate operations comprising those of any of embodiments 1-12.

13. A system comprising means for performing any of embodiments 1-12.

14. A system comprising cloud-based circuitry for performing any of embodiments 1-12.

What is claimed is:

1. A system for managing resource access permissions for users with unknown credentials, the system comprising:

one or more processors; and a non-transitory, computer-readable medium storing instructions that, when executed by the one or more processors, cause operations comprising:

receiving, from a first user, a resource access request for a system, wherein the resource access request comprises a first user identifier and a first access level requested by the first user;

based on the first user identifier, determining a measure of risk associated with allocating resources to the first user;

determining whether the first access level is permitted based on the measure of risk for the first user;

in response to determining that the first access level is permitted, inserting the first user identifier in a first access control list from a plurality of access control lists, thereby causing the first user to have access to a first resource;

at a subsequent time, receiving information regarding resources accessed by the first user;

based on the received information, determining an updated measure of risk associated with allocating resources to the first user;

determining whether a second access level is permitted based on the updated measure of risk for the first user, wherein the second access level provides access to a second resource in addition to the first resource; and in response to determining that the second access level is permitted, inserting the first user identifier in a second access control list from the plurality of access control lists, thereby causing the first user to have access to the second resource in addition to the first resource.

2. A method, the method comprising:

receiving, by one or more processors and for a first user, a first access level permitted based on a measure of risk associated with allocating resources to the first user, wherein a first user identifier for the first user has been inserted in a first access control list from a plurality of access control lists, thereby causing the first user to have access to a first resource;

based on information regarding resources accessed by the first user subsequent to the first user having access to the first resource, determining, by the one or more processors, an updated measure of risk associated with allocating resources to the first user; and in response to determining that a second access level is permitted based on the updated measure of risk for the first user, inserting, by the one or more processors, the first user identifier in a second access control list from the plurality of access control lists, thereby causing the first user to have access to a second resource in addition to the first resource.

3. The method of claim 2, further comprising:

based on the first user identifier, determining, by the one or more processors, the measure of risk associated with allocating resources to the first user, comprising:

accessing, by the one or more processors, from a user database, a resource access history corresponding to the first user identifier;

based on the resource access history, determining, by the one or more processors, a plurality of resource access events; and based on the plurality of resource access events, determining, by the one or more processors, the measure of risk associated with allocating resources to the first user.

4. The method of claim 3, wherein, based on the plurality of resource access events, determining the measure of risk associated with allocating resources to the first user comprises:

processing, by the one or more processors, using a machine learning model, the plurality of resource access events to generate a plurality of predicted resource access events for the first user; and based on the plurality of predicted resource access events, determining, by the one or more processors, the measure of risk associated with allocating resources to the first user.

5. The method of claim 3, further comprising:

identifying, by the one or more processors, a first time corresponding to inserting the first user identifier in the first access control list;

determining, by the one or more processors, a plurality of event timestamps, each event timestamp corresponding to each resource access event in the plurality of resource access events;

based on the plurality of event timestamps, determining, by the one or more processors, that, during an elapsed probationary time period from the first time, no resource access event in the plurality of resource access events includes a prohibited event from a plurality of prohibited events; and based on determining that no resource access event in the plurality of resource access events includes the prohibited event, inserting, by the one or more processors, the first user identifier in the second access control list.

6. The method of claim 2, further comprising:

determining, by one or more processors, whether the first access level is permitted based on the measure of risk for the first user, comprising:

determining, by one or more processors, a first threshold measure of risk corresponding to the first access level, wherein the first threshold measure of risk indicates a maximum measure of risk for user access to the first resource; and based on comparing the first threshold measure of risk and the measure of risk, determining, by one or more processors, whether the first access level is permitted.

7. The method of claim 2, wherein determining the updated measure of risk associated with allocating resources to the first user comprises:

determining, by the one or more processors, from the information regarding resources accessed by the first user, a plurality of resource access events; and based on determining that the plurality of resource access events comprises a risky action and/or one or more required actions, determining, by one or more processors, the updated measure of risk associated with allocating resources to the first user.

8. The method of claim 2, wherein determining, by one or more processors, that the second access level is permitted based on the updated measure of risk for the first user comprises:

determining, by one or more processors, a second threshold measure of risk corresponding to the second access level, wherein the second threshold measure of risk indicates a maximum measure of risk for user access to the second resource; and based on comparing the second threshold measure of risk and the updated measure of risk, determining, by one or more processors, that the second access level is permitted.

9. The method of claim 2, further comprising:

based on determining that the first access level is not permitted based on the updated measure of risk for the first user, causing, by one or more processors, the first user identifier to be removed from the first access control list, thereby causing the first user to lose access to the first resource.

10. The method of claim 2, further comprising:

based on the updated measure of risk, inserting, by one or more processors, the first user identifier into the second access control list at a first time; and after a probationary period of time has elapsed beyond the first time, causing, by one or more processors, the first user identifier to be removed from the second access control list, thereby causing the first user to lose access to the second resource.

11. The method of claim 2, further comprising:

based on the updated measure of risk, inserting, by one or more processors, the first user identifier into a third access control list, thereby causing the first user to have access to the second resource and to lose access to the first resource.

12. A non-transitory, computer-readable medium comprising instructions that, when executed by one or more processors, cause operations comprising:

receiving, for a first user, a first access level permitted based on a measure of risk associated with allocating resources to the first user, the first user having access to a first resource;

based on information regarding resources accessed by the first user subsequent to the first user having access to the first resource, determining an updated measure of risk associated with allocating resources to the first user; and in response to determining that a second access level is permitted based on the updated measure of risk for the first user, causing the first user to have access to a second resource in addition to the first resource.

13. The non-transitory, computer-readable medium of claim 12, wherein the instructions cause operations further comprising, based on a first user identifier corresponding to the first user, determining the measure of risk associated with allocating resources to the first user, comprising:

accessing, from a user database, a resource access history corresponding to the first user identifier;

based on the resource access history, determining a plurality of resource access events; and based on the plurality of resource access events, determining the measure of risk associated with allocating resources to the first user.

14. The non-transitory, computer-readable medium of claim 13, wherein the instructions, for, based on the plurality of resource access events, determining the measure of risk associated with allocating resources to the first user, cause operations further comprising:

processing, using a machine learning model, the plurality of resource access events to generate a plurality of predicted resource access events for the first user; and based on the plurality of predicted resource access events, determining the measure of risk associated with allocating resources to the first user.

15. The non-transitory, computer-readable medium of claim 13, wherein the instructions cause operations further comprising:

identifying a first time corresponding to the first user gaining access to the first resource;

determining a plurality of event timestamps, each event timestamp corresponding to each resource access event in the plurality of resource access events;

based on the plurality of event timestamps, determining that, during an elapsed probationary time period from the first time, no resource access event in the plurality of resource access events includes a prohibited event from a plurality of prohibited events; and based on determining that no resource access event in the plurality of resource access events includes the prohibited event, inserting the first user identifier in a second access control list, thereby causing the first user to have access to a second resource in addition to the first resource.

16. The non-transitory, computer-readable medium of claim 12, wherein the instructions cause operations further comprising:

determining whether the first access level is permitted based on the measure of risk for the first user, comprising:

determining a first threshold measure of risk corresponding to the first access level, wherein the first threshold measure of risk indicates a maximum measure of risk for user access to the first resource; and based on comparing the first threshold measure of risk and the measure of risk, determining whether the first access level is permitted.

17. The non-transitory, computer-readable medium of claim 12, wherein the instructions, for determining the updated measure of risk associated with allocating resources to the first user, cause operations further comprising:

determining, from the information regarding resources accessed by the first user, a plurality of resource access events; and based on determining that the plurality of resource access events comprises a risky action and/or one or more required actions, determining the updated measure of risk associated with allocating resources to the first user.

18. The non-transitory, computer-readable medium of claim 12, wherein the instructions, for determining that the second access level is permitted based on the updated measure of risk for the first user, cause operations further comprising:

determining a second threshold measure of risk corresponding to the second access level, wherein the second threshold measure of risk indicates a maximum measure of risk for user access to the second resource; and based on comparing the second threshold measure of risk and the updated measure of risk, determining that the second access level is permitted.

19. The non-transitory, computer-readable medium of claim 12, wherein the instructions cause operations further comprising:

based on determining that the first access level is not permitted based on the updated measure of risk for the first user, causing a first user identifier associated with the first user to be removed from a first access control list, thereby causing the first user to lose access to the first resource.

20. The non-transitory, computer-readable medium of claim 12, wherein the instructions cause operations further comprising:

based on the updated measure of risk, inserting a first user identifier corresponding to the first user into a second access control list at a first time, thereby causing the first user to have access to the second resource; and after a probationary period of time has elapsed beyond the first time, causing the first user identifier to be removed from the second access control list, thereby causing the first user to lose access to the second resource.

\* \* \* \* \*